US009959756B2

(12) United States Patent
Filley et al.

(10) Patent No.: US 9,959,756 B2
(45) Date of Patent: May 1, 2018

(54) TRANSMISSION OF TARGETED ROADWAY ALERTS

(71) Applicant: HERE Global B.V., Veldhoven (NL)

(72) Inventors: George Filley, Deer Park, IL (US);
Kevin Moran, West Dundee, IL (US);
Anatoly Belkin, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 137 days.

(21) Appl. No.: 14/872,628

(22) Filed: Oct. 1, 2015

(65) Prior Publication Data
US 2017/0098373 A1    Apr. 6, 2017

(51) Int. Cl.
| G08G 1/0968 | (2006.01) |
| H04W 4/02 | (2018.01) |
| H04W 4/22 | (2009.01) |
| G08G 1/01 | (2006.01) |

(52) U.S. Cl.
CPC ..... G08G 1/096805 (2013.01); G08G 1/0125 (2013.01); G08G 1/0141 (2013.01); H04W 4/021 (2013.01); H04W 4/22 (2013.01)

(58) Field of Classification Search
CPC ........ H04W 92/02; H04L 12/18; H04L 67/18; H04L 12/189; H04L 12/1895; H04L 12/14; H04L 12/1432; H04L 12/1859; H04L 12/5855; H04L 12/5865; H04L 51/20; H04L 63/0428; H04L 63/08; H04L 65/4076
See application file for complete search history.

(56) References Cited

U.S. PATENT DOCUMENTS

| 5,384,926 | A | 1/1995 | Al-Bargi |
| 8,471,701 | B2 | 6/2013 | Yariv et al. |
| 9,247,523 | B1 | 1/2016 | Bhatia et al. |
| 9,332,387 | B2 | 5/2016 | Davis et al. |
| 2004/0080430 | A1* | 4/2004 | Videtich .......... G08G 1/096716 340/905 |
| 2008/0186027 | A1 | 8/2008 | Kassai |

(Continued)

FOREIGN PATENT DOCUMENTS

| DE | 2714695 A1 | 10/1978 |
| DE | 4229998 A1 | 3/1994 |

(Continued)

OTHER PUBLICATIONS

Araniti et al., LTE for Vehicular Networking: A Servery, May 2013, University Mediterranea Reggio Calabria.

(Continued)

*Primary Examiner* — Jelani A Smith
(74) *Attorney, Agent, or Firm* — Lempia Summerfield Katz LLC

(57) ABSTRACT

A method and apparatus for transmission of targeted roadway alerts. A server receives a first description of an incident. The server determines an impact area of the incident based on the description. The server generates a geographic polygon based on the impact are of the incident. The server overlays the geographic polygon on a first cellular map and transmits an alert message to one or more devices located within a cell of the first cellular map that contains at least a portion of the geographic polygon.

14 Claims, 9 Drawing Sheets

(56) References Cited

U.S. PATENT DOCUMENTS

| | | | |
|---|---|---|---|
| 2009/0005968 A1* | 1/2009 | Vengroff | G06F 17/3087 |
| | | | 701/425 |
| 2009/0233575 A1* | 9/2009 | Morrison | G08G 1/096725 |
| | | | 455/404.2 |
| 2009/0247186 A1* | 10/2009 | Ji | G01S 5/02 |
| | | | 455/456.1 |
| 2011/0223881 A1* | 9/2011 | Brok den | H04W 4/22 |
| | | | 455/404.2 |
| 2012/0208492 A1 | 8/2012 | Tschofenig et al. | |
| 2013/0099941 A1 | 4/2013 | Jana et al. | |
| 2014/0159923 A1 | 6/2014 | Koodli et al. | |
| 2016/0028648 A1 | 1/2016 | Wohlert et al. | |
| 2016/0036917 A1 | 2/2016 | Koravadi et al. | |
| 2017/0270413 A1 | 9/2017 | Moreira-Matias et al. | |

FOREIGN PATENT DOCUMENTS

| | | | |
|---|---|---|---|
| EP | 0443174 A1 | 8/1991 | |
| EP | 0973182 A2 | 1/2000 | |
| WO | WO8200247 A1 | 2/1982 | |
| WO | WO2013189974 | 12/2013 | |
| WO | WO2015012748 A1 | 1/2015 | |

OTHER PUBLICATIONS

Festag, Geocasting Over 11p, LTE and Beyond, Feb. 9, 2012, 4th ETSI TC ITS Workshop.

Intelligent Transport System (ITS); Vehicular Communications; Basic Set of Applications; part 1: Functional Requirements, Sep. 2010, V1.1.1, ETSI.

Intelligent Transport Systems (ITS); Vehicular Communications; Basic Set of Applications; Part 3: Specifications of Decentralized Environment Notification Basic Service, Nov. 2014, European Standard.

Marshall, Geotrigger puts Geofencing in Esri Mobile Apps, Dec. 6, 2013, GCN.com.

Sachs, Potential of LTE for Machine-to-Machine Communication, Nov. 28, 2013, Ericsson.

Vinel, 3GPP LTE Versus IEEE 802.11p/WAVE: Which Technology is Able to Support Cooperative Vehicular Safety Applications?, Apr. 2012, Tampere University of Technology.

Abou-zeid, Hatem. Predictive Radio Access Networks for Vehicular Content Delivery. Diss. Queen's University, 2014.

German Office Action in corresponding German Patent Application No. DE 10 2014 205 837.6, dated Nov. 18, 2014 with English translation.

Scroxton, A. (May 21, 2015). Connected cars driving into mobile traffic jams. Retrieved Aug. 30, 2016, from http://www.computerweekly.com/news/4500246736/Connected-cars-driving-into-mobile-traffic-jams?src=itke stub.

PCT International Search Report and Written Opinion of the International Searching Authority dated Dec. 8, 2016 for PCT/EP2016/073151.

* cited by examiner

TRANSMISSION OF TARGETED ROADWAY ALERTS

FIELD

The following disclosure relates to transportation systems and transit related applications, and more specifically to receiving events, determining an impact area, and transmitting a roadway alert.

BACKGROUND

Modern traffic management systems use broadcast methods with limited geographic targeting to provide environmental information and conditions. The information is also reactive versus proactive for those receiving said information. The most defined areas around an incident are usually based on traffic management center nodes and/or other location determinations (location referencing objects (LRO), dynamic location referencing (DLR), location referencing methods (LRMs)) which are then broadcast as generic incident information which is then used to communicate information that can be translated into new destination arrival times or generic alerts. Two main types of messaging are used in current communication systems: Cooperative Awareness Messages (CAM) and Decentralized Event Notification Messages (DENM).

Cooperative Awareness Messages (CAM) are the message communication pattern in which every vehicle in the network sends a message to every other vehicle within its range of communication periodically. These messages generally include the geographical location of the vehicle, the velocity of the vehicle, and the basic status of communicating vehicles to neighboring vehicles that are located within a single hop distance.

Decentralized Event Notification Messages (DENM) are generated when a certain hazardous event (e.g. accident) has taken place on the road. The generation of these messages is dependent on the occurrence of certain events. Such an event is not routinely transmitted as CAMs. DENMs are also termed as event triggered messages and the messages do not have any fixed schedule of transmission. The value of information of DENMs is much more than that of CAMs since it is directly related to the road safety applications.

SUMMARY

In one embodiment, a method for transmission of targeted roadway alerts. A server receives a first description of an incident. The server determines an impact area of the incident based on the description. The server generates a geographic polygon based on the impact area of the incident. The server generates a geographic polygon which can be overlaid on a cellular map. The server transmits an alert message to devices located within all cell sites which covers at least a portion of the geographic polygon.

In one embodiment, an apparatus is configured to receive a description of an incident. The apparatus is configured to generate an impact area of the incident based on the description. The apparatus is configure to generate a geographic polygon based on the impact area of the incident and transmit an alert message and the geographic polygon to a first cellular provider.

In one embodiment, a method comprises a device generating a first route from a current position to a destination. The device receives, when inside the impact area, a roadway alert, wherein the roadway alert indicates an incident which affects a flow of traffic inside the impact area of the incident. The device generates a second route to the destination based on the roadway alert.

In one embodiment, an apparatus is configured to generate a first route from a starting position to a destination. The device is configured to receive, from a first cellular tower, a roadway alert, wherein the roadway alert indicates an incident which affects a flow of traffic within the range of the first cellular tower. The device is configured to generate a second route to the destination based on the roadway alert.

BRIEF DESCRIPTION OF THE DRAWINGS

Exemplary embodiments of the present invention are described herein with reference to the following drawings.

DETAILED DESCRIPTION

The following embodiments relate to a reception of events (e.g. from vehicles or roadside sensors), filtering, processing, and cellular re-distribution to relevant traffic participants within an impacted area. The embodiments take advantage of highly accurate maps, real-time and historical flow information and analytics to determine the impact that an incident will have. The resulting analysis generates a geographic polygon based on the area and roads that will be impacted by the incident and the latency necessary to provide information to impacted parties. The polygon created, has continuously updated parameters, defined by the latitude/longitude points calculated through ongoing impact analytics, based on the nature of the incident and the impact it will have over time, which determines the changing impact coverage area required to send alert messages. The polygon is overlaid on the cellular infrastructure involved, creating targeted transmission points that can be sent simultaneously to all networks in the impacted area. The following embodiments use targeted versus broadcast messages, deliver messages with lower latency, and are wireless infrastructure independent.

Figure 1:
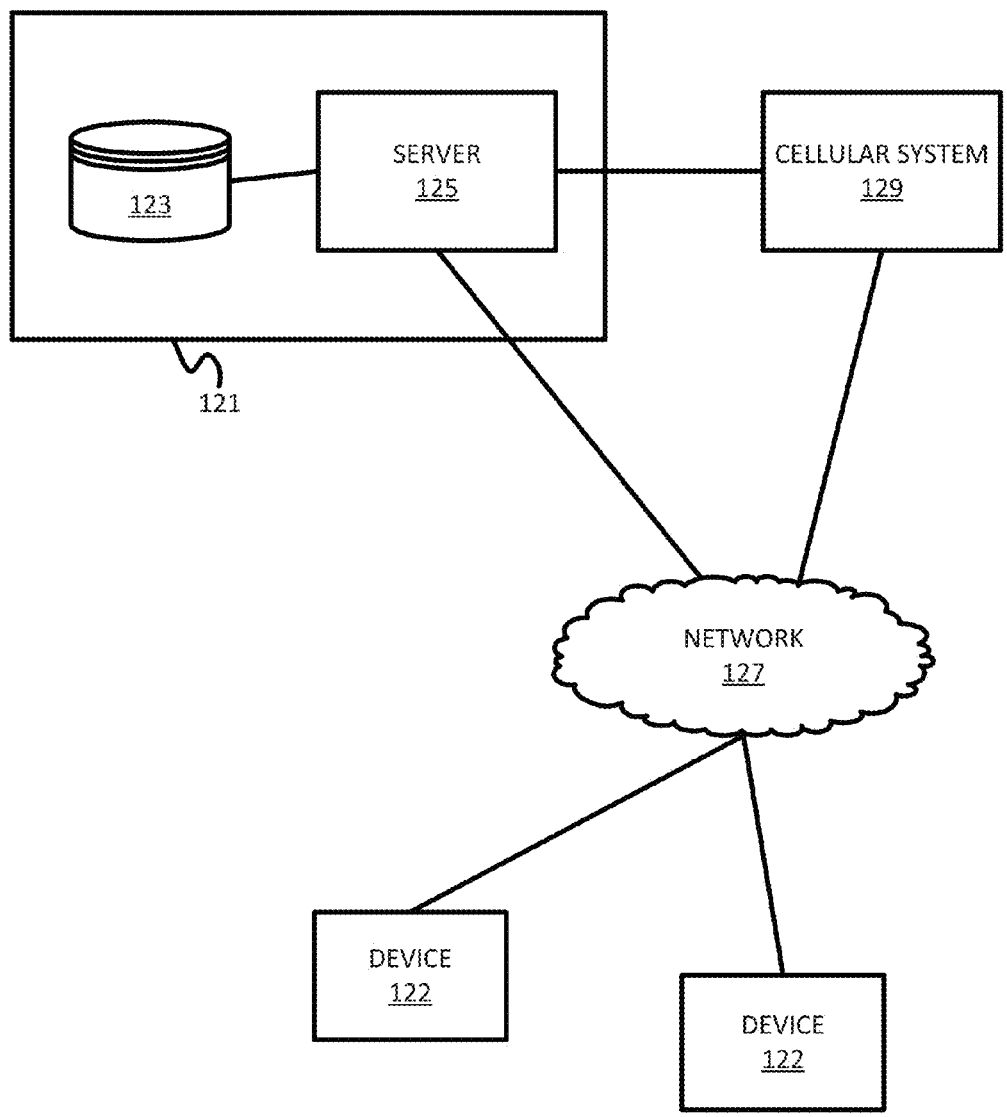
FIG. 1 illustrates an example system for transmission of targeted roadway alerts.

FIG. 1 illustrates a system for transmission of targeted roadway alerts. The system comprises one or more collection devices 122, a network 127, a cellular system 129, and a location cloud 121. The collection device(s) 122 are coupled with or wirelessly connected to the network 127 which are coupled with or wirelessly connected to both the cellular system 129 and the location cloud 121. The location cloud 121 is coupled with to the cellular system 129. Herein, the phrase "coupled with" is defined to mean directly connected to or indirectly connected through one or more intermediate components. Such intermediate components may include both hardware and software based components. Additional, different, or fewer components may be included. For example, in certain embodiments, system may include additional or different components such as a traffic management center. The cellular system 129 may include the network 127 or may manage a part of the network 127. There may be multiple cellular systems 129 included in the system.

The collection device(s) (also referred to as "devices") 122 may be a mobile device or a tracking device that provides samples of data for the location of a vehicle. The collection device(s) 122 may be mobile phones running specialized applications that collect location data as people travel roads as part of their daily lives. The device(s) 122 may also be integrated in or with a vehicle. Switches, sub-systems or sensors that are either standard or optional equipment on a vehicle may collect and aggregate information regarding the operation of the vehicle. The device(s) may also be a sensor or a collection of sensors, such as an inductance loop or optical detector (e.g., camera, light detection and ranging (LiDAR), or radar device). The device(s) may be a camera/imaging sensor for gathering image data (e.g., the camera sensors may automatically capture traffic flow information, abnormal incidents, and/or traffic light information. The device(s) may be sensors located on the perimeter of the vehicle in order to detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. The device(s) 122 and/or other sensor(s) may collect data from one or more vehicles and aggregate the data into event data including vehicle data or the road conditions. The event data may be transmitted over the network. The device(s) 122 may also be configured to receive a roadway alert from the location cloud 121. The device(s) may use the roadway alert to generate or alter routes. The device(s) may be configured to use the roadway alert to operate a vehicle.

The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to TCP/IP based networking protocols.

The location cloud 121 may be comprised of one or more servers, workstations, databases, and other machines connected together and maintained by a manager of connected vehicle data, including but not limited to map, sensor, temporal climate and incident data. The location cloud 121 (or traffic management system) may include one or more server(s) 125 such as a sensor ingestion server, a traffic management server, and/or an analytics server. The location cloud 121 may also include a database 123. The location cloud 121 may be configured to provide up to date information and maps to external map databases or mapping applications. The location cloud 121 collects or ingests data from multiple sources, such as through the network 127, in order to maintain up to date roadway conditions. Data such as sensor data, weather, road conditions, traffic flow, and historical data is processed to determine current and future traffic conditions. The location cloud 121 may determine an incident type, an incident location, an impact area, an incident duration, and an incident transmission rate from the collected data. The location cloud 121 updates the incident as additional data is collected and the incident evolves over time. The term location cloud 121 is used herein to collectively include the ingestion, analytic/computational, interface API's and message distribution capabilities residing in both local and cloud based systems including the systems used for creating, maintaining, accessing, and updating one or more database(s) 123.

The database 123 (also referred to as a dynamic content database, sensor ingestion database, traffic database, map database or geographic database) may include geographic data used for traffic and/or navigation-related applications. The geographic data may include data representing a road network or system including road segment data and node data. The road segment data represent roads. The node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes. The traffic database 123 may contain historical data such as previous traffic conditions including events or incidents that relate the to the previous traffic conditions.

In addition to the data describe above, the map database 123 may include node data records, road segment or link data records, Point of Interest (POI) data records, and other data records. More, fewer or different data records can be provided. In one embodiment, the other data records include cartographic data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or Global Positioning System (GPS) data associations (such as using known or future map matching or geo-coding techniques).

The road segment data records are links or segments representing roads, streets, or paths, which may be used for determination of one or more routes. The node data records are points corresponding to the respective links or segments of the road segment data records. The road link data records and the node data records represent a road network, such as used by vehicles, cars, and/or other entities. Alternatively, for example, the map database 123 may contain path segment and node data records or other data that represent pedestrian paths or areas in addition to or instead of the vehicle road record data.

The road or link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 123 may include data about the POIs and their respective locations in the POI data records. The database 123 may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the map database 123 may include historical and current event data (e.g., traffic incidents, constructions, scheduled events, unscheduled events, etc.) associated with the POI data records or other records of the database 123.

The database 123 may be maintained by a content or communications provider (e.g., a map or sensor data management provider). By way of example, a map developer may collect vehicle, roadway, and traffic data to generate and enhance the traffic database 123. Data may be obtained from multiple sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used. The database 123 may also integrate data collected from collection device(s) or sensors.

A cellular system 129 may include one or more cellular network managers and one or more cellular boundary generators. The cellular system 129 receives an alert message from the location cloud 121 including an impact area. The cellular boundary generators overlays the impact area with a cellular map provided by the cellular network manager. The impacted cells are then used as the transmission area for the alert message. There may be multiple cellular systems 129 maintained by separate providers. Each provider may maintain a separate network of cellular towers and may have distinct coverage patterns.

Figure 2:
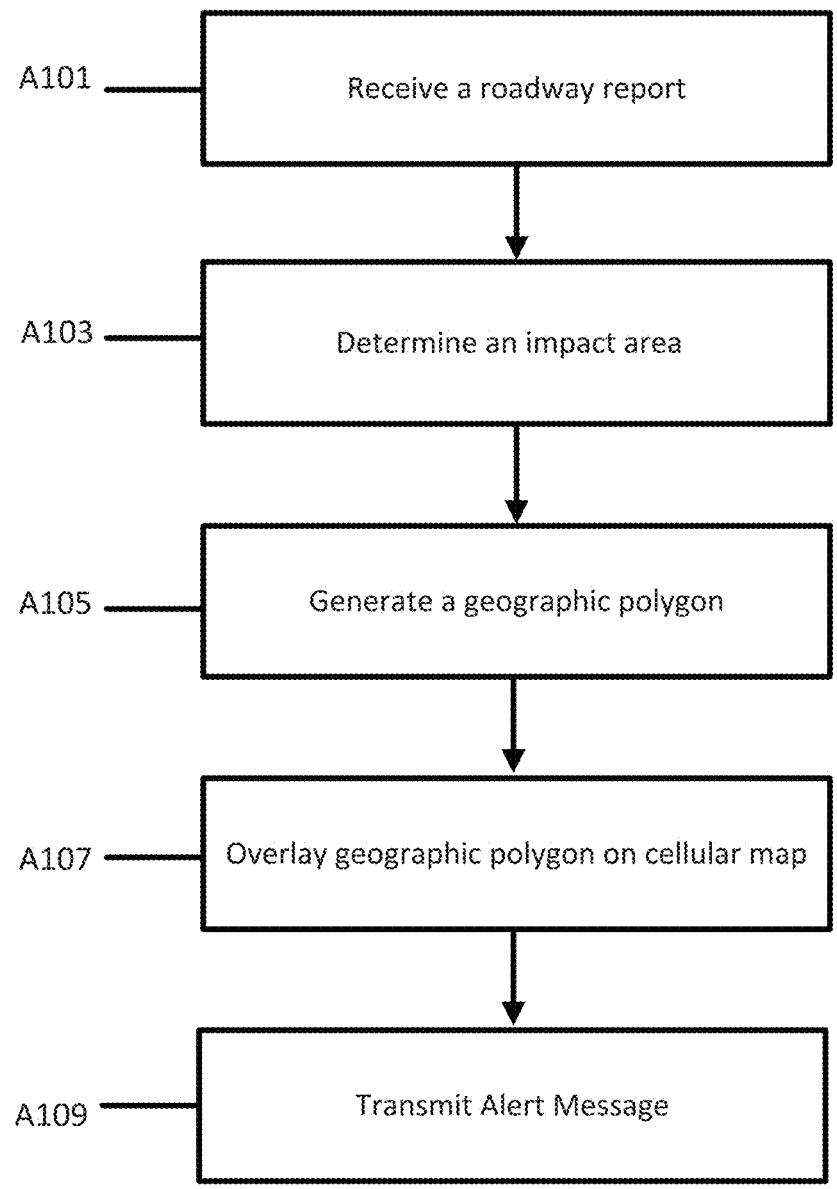
FIG. 2 illustrates an example flow chart of an method for transmission of targeted roadway alerts

FIG. 2 illustrates a flow chart of a method for transmission of targeted roadway alerts. As presented in the following sections, the acts may be performed using any combination of the components indicated in FIG. 1, FIG. 7, or FIG. 8. The following acts may be performed by the server 125, cellular system 129, the location cloud 121, or a combination thereof. Additional, different, or fewer acts may be provided. The acts are performed in the order shown or other orders. The acts may also be repeated.

At act A101, the location cloud 121 receives a roadway event through the network 127. The roadway event may include a roadway description, a roadway location, and a time. Roadway events may be determined from a variety of sources. The roadway event may originate with the collection device(s) such as a probe or sensor. A device may be configured to collect data from multiple sources to create a roadway event. A vehicle (or device(s) integrated into vehicles) may transmit data regarding their operation or roadway conditions over the network. Remote sensing, such as aerial or satellite photography may be used to collect information. Field personal may report roadway conditions, which may be collected automatically or manually. Roadway events may be collected from social networks or from other internet based sources. A device may also be used as one or more probes or sensor(s) to collect roadway data. Roadway events may include a roadway location (from GPS, navigational device, mobile devices, or other devices that may collect positional data) and a time of the event (or a time of transmission).

Roadway descriptions may encode a wide range of road information, from accidents, obstructions to congestion and delays. Roadway descriptions may also deal with public transport from rail, bus to air traffic and ferry services. Other roadway events or features might include: vehicular operation (such as brake lights, slowing of speed, windshield wiper operation, or other vehicular sensors monitoring the vehicle's operation), construction, accidents, roadway closures, roadway congestion, roadway speeds, roadway surface condition, roadway environmental condition, roadway traversal energy information (for use in green routing applications), or other 'non-normal' roadway conditions. These descriptions may reference current conditions or prior conditions.

At act A103, the location cloud 121 processes the roadway event(s) to determine an impact area at a certain time. The roadway event may be an update to a previously received event, such as an updated event with current description of vehicular operation (potentially including a current speed). Each roadway event is classified as either relating to a previous incident or a new incident. Multiple roadway events may be classified as relating to a single incident. For example, the location cloud 121 may receive multiple events regarding an accident, from visual (images) to audio to reports indicating that multiple vehicles have slowed. These events may be collected from different sources over a period of time. The location cloud 121 processes each event to determine if the event relates to a current ongoing incident. Each additional event that is related to the ongoing incident is part of the incident information flow and may affect an alert as the incident and alert evolve over time.

In addition to receiving events from different sources, the location cloud 121 may receive multiple events from a single source. In such an example, a new event may update a previously received event. For example, a first event may indicate that a vehicle is slowing or stopped. A second event received subsequently from the same vehicle may indicate that the vehicle is moving at an expected speed. Depending on the information included, a subsequent event may indicate that an incident has passed and that an alert need be withdrawn or updated. In other embodiments, subsequent events are used by the location cloud 121 to evolve or update an impact area as explained below.

The location cloud 121 may use data from multiple events as mentioned above. The location cloud 121 may also analyze data regarding weather conditions, road conditions, current traffic conditions, and historical traffic conditions. The historical traffic conditions may also include prior event data. The impact area is generated by looking at current and historical traffic conditions and comparing how events affect the surrounding roadway network. For example, a previous event (such as an accident) may have affected the road segment where the accident occurred, but also may have affected multiple other surrounding areas. The impacted area may also be affected by the time of day, the weather conditions, among other factors.

At act A105, the location cloud 121 uses analytics to generate a geographic polygon ("polygon") based on the roads that will be impacted by the incident and the latency (timing) necessary to provide information to the affected parties. The polygon created is the means of determining the transmission sites that will be required to send alert messages by overlaying said polygon on the wireless infrastructure(s) involved, creating targeted transmission points that can be sent simultaneously to all networks and relevant $3^{rd}$ party clouds (e.g. Traffic Management Centers, OEMs) in the impacted area.

As additional events are received by the location cloud 121, the polygon is shaped in real time based on incident information flow. Each additional event within the information flow that is related to an incident is filtered and processed. The information from each additional event may be used to adjust an impact area. For example, a traffic congestion incident may worsen over time. The initial event may indicate that a certain area will be affected. However, as additional events from other vehicles are received and analyzed, the impacted area may evolve over time. A larger or smaller area may be affected. In certain embodiments, even without additional events, the impact area may be altered over time. Using historical data, the location cloud 121 may predict the evolution of an incident without additional real-time inputs of data. For example, a traffic congestion incident at a known intersection at a certain time under certain road and weather conditions may dissipate at a known rate based on historical data. The location cloud 121 may predict that the incident may affect an outlying road segment, but only for a limited amount of time. The polygon will include that road segment initially, but the polygon may evolve over time and subsequent alerts may not be sent to devices or vehicles located at that geographic location (or road segment). Each alert may have a timeout component that is related to the evolution of the polygon. The alert may be transmitted until the timeout point is reached, which may correspond to impact area no longer affecting (or affecting in a different way) the area that is being transmitted to.

Leveraging historical as well as real-time traffic and incident data provides an element of predictive analytics around creation of a polygon. Historical traffic data (e.g. speed or flow or volume) may be stored within the database alongside each road segment or node. Each road segment may contain historical traffic data for each of weather conditions, road conditions, or time of day. The traffic data for each segment may be updated as new data is processed. To decrease latency for computing the polygon, segments may be grouped into classifications depending on the segments their historical traffic patterns or common attributes. For example, certain road segments that are similar may share a common profile instead of having separate historical profiles. Other data beyond traffic data for road segments or nodes may also be used as historical data. Historical traffic patterns and flow volume may also be stored for road segments or geographic locations. Historical traffic data may also be saved, archived or organized event by event (or incident by incident). For example, a roadwork warning in a certain location may be a repeatable event for not only that location but also other similar locations. These events and the subsequent impacts may be stored in the database to be used both as models for specific locations and also as models for similar events occurring at different locations.

Driver tendencies may also be used to provide additional information that could influence the predicted analytics and subsequent impact area generated from said data. For example, different drivers in different regions or countries make different decisions when confronted with certain obstacles or conditions. These decisions may be stored and used to predict how an impact area may evolve over time.

The polygon may be shaped by the presence of an alternative route. Traffic flow may be modelled based on the historical data, but also may depend on alternatives routes or bypasses. If there is an alternative route, the impact area of an incident may be smaller, and may dissipate quicker than if there are no alternative routes. Further, the location cloud 121 may take into account how many vehicles are being guided by navigation systems (which might affect the routing of those vehicles). For example, vehicles which receive the alerts may be more likely to take an alternative route, which in turn may alter the shape of the polygon over time.

The polygon may be created using the map database and the road segments and nodes contained within the database. The geographic polygon may be created using a geographic coordinate system such as latitude and longitude. For example, the boundary of the polygon may be described using geographic coordinates. The polygon may also be described using a set or list of road segments or nodes. The polygon may extend for a certain distance along a road segment (possibly with an offset from a starting node). The polygon may be a combination of two or more areas that overlap. The polygon may include both directions of a roadway or just a single direction. The polygon may exclude areas such as parking lots or other areas that are not affected.

Once polygons are created, they can be archived for future use to reduce latency around analytics necessary to generate said polygon. A polygon may be saved once a correlation is made between the incident, location and nature of the alert. The evolution of the polygon over time may also be archived and used in future predictions.

At act A107, the location cloud 121 overlays the geographic polygon on the carrier infrastructure associated with a cellular coverage area (e.g. a cellular map). The cellular map may have been previously generated or received from a cellular system 129. The cellular map may be generated by a cell boundary generator. The cellular map may be a geographic map which indicates the coverage area for each individual cell. Different wireless providers may have different cellular maps. For example, a first provider may use different towers than a second provider and as such have different coverage maps. The location cloud 121 may overlay the polygon on each individual cellular map. The cells that include a part of the polygon will be the cells that are alerted. As different providers have different maps, this may lead to different areas being alerted for different providers. There may be a threshold for how much overlap is required to include a cell in a transmission pattern. For example, the polygon may have to cover at least a predetermined threshold amount of the cell in order for an alert to be sent through that tower (and that cell). The predetermined threshold amount may be 5%, 10%, 50% or another value between 0 and 1. In certain embodiments, the cellular map may consist of transmitter ranges. A map may include the range of each transmitter over a geographic area. The map may include the range of one or more base transceiver stations (BTS) or one or more connected E-UTRAN Node B stations.

As the event evolves over time, the geographic polygon may change shape and as such, the overlay on the cellular map may change the affected cells. When a cell is no longer impacted, that cell may be sent a message that the alert is over. An alert may also be time-limited so that if it is not refreshed by the location cloud 121, it may expire.

At act A109, the location cloud 121 transmits an alert message to the devices that are within the cells that are impacted by the roadway incident. The alert may be transmitted by the cellular provider or directly from the location cloud 121. As mentioned above, the alert may be transmitted to different areas depending on the cellular/tower coverage of different providers.

The alert message may be formatted as a DENM as specified in ETSI TS 102 637-3 incorporated by reference. DENMs are used for detected events typically including an event position or location and an event duration. A DENM may be system agnostic and may be used by multiple platforms such as navigation devices or vehicular control systems. A DENM may also be used along with CAMs to provide navigation services to autonomous vehicles. DENMs or other alerts may be updated as an incident and impact area evolve. Alerts may be time limited or geographically limited to expire either after a specified duration of time or if the device or vehicle exits the impacted area.

The information included within the alert message may be used to create or alter an existing route. For example, a navigation device may calculate a route from a starting point to a destination involving several road segments. If prior to or during travel along the route, a navigation device 122 receives an alert message indicating that an accident, construction, road closure, or other event has occurred, the navigation device 122 may generate an alternative route taking into consideration the roadway description and the impact area. These alert messages are useful in that the alert message may include extensive information that is useful for routing decisions and since the alert messages are geographically limited, they do not overwhelm the network or devices with unnecessary updates. Industries and services that use navigations service require up to date information to make intelligent routing decisions. Services such as delivery services or emergency services may prefer that accidents, congestion, construction, or other roadway descriptions are known immediately when they occur and how they evolve over time in order to perform their function efficiently. Vehicles may equipped with a variety of sensors to enable safety and comfort features. However, these on-board sensors are limited to a relatively short range and line-of-sight. A navigation system may contain valuable information about the road segments lying ahead, such as road geometry, functional road class, number of lanes, speed limits, traffic signs, etc. This data can be extracted and provided to applications as the so-called electronic horizon. The data needs to be correct and up to date to avoid re-calculations and to ensure proper operation of the vehicle.

The information included in the alert message may also be used to directly or indirectly navigation a vehicle. The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the incident data in the alert message provided to the navigation device 122.

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

Figure 3:
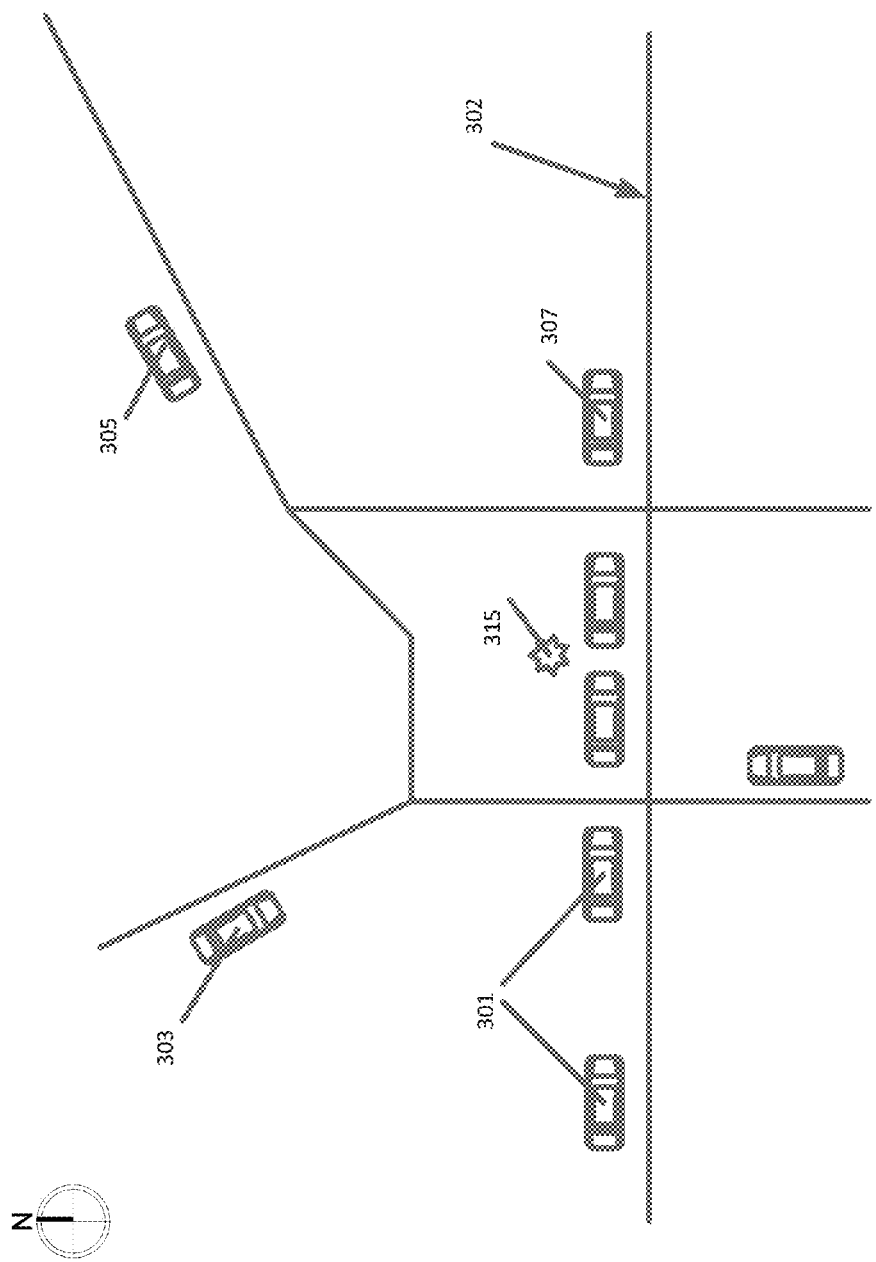
FIG. 3 illustrates an example roadway network and event.

FIGS. 3, 4, 5, and 6 illustrate an example of distributing a geographically limited alert message. FIG. 3 illustrates a roadway network 302, multiple vehicles (301, 303, 305, 307), and a traffic event 315. The event 315 in this example may be a traffic accident, but could be any number of different events. Different types of events in different locations might generate different impact areas. The vehicles represented in FIG. 3 are traveling in the following directions. Vehicle 303 is traveling south-east. Vehicles 301, and Vehicle 307 are traveling east. Vehicle 305 is traveling north east. The event 315 may be reported by a roadway sensor or a vehicle probe. Vehicles 301 may begin to slow after the event takes place. Multiple devices may report an event though the network to the location cloud 121. The location cloud 121 receives each event message and processes the entirety to determine that this is a single incident located at the event 315. The location cloud 121 may determine that this incident is most likely a traffic accident from the behavior of the surrounding vehicles, or perhaps a sensor in the involved vehicle.

Once the incident location and severity has been determined from the one or more events, the location cloud 121 may check the weather and road conditions. The location cloud 121 may access historical records for both the type of incident and the specific location. Using a detailed geographic and roadway map stored in the database 123, the location cloud 121 determines an impact area based on all the data present including but not limited to the location, severity, weather, road conditions, roadway network, historical data, and any other event being received in the area.

Figure 4:
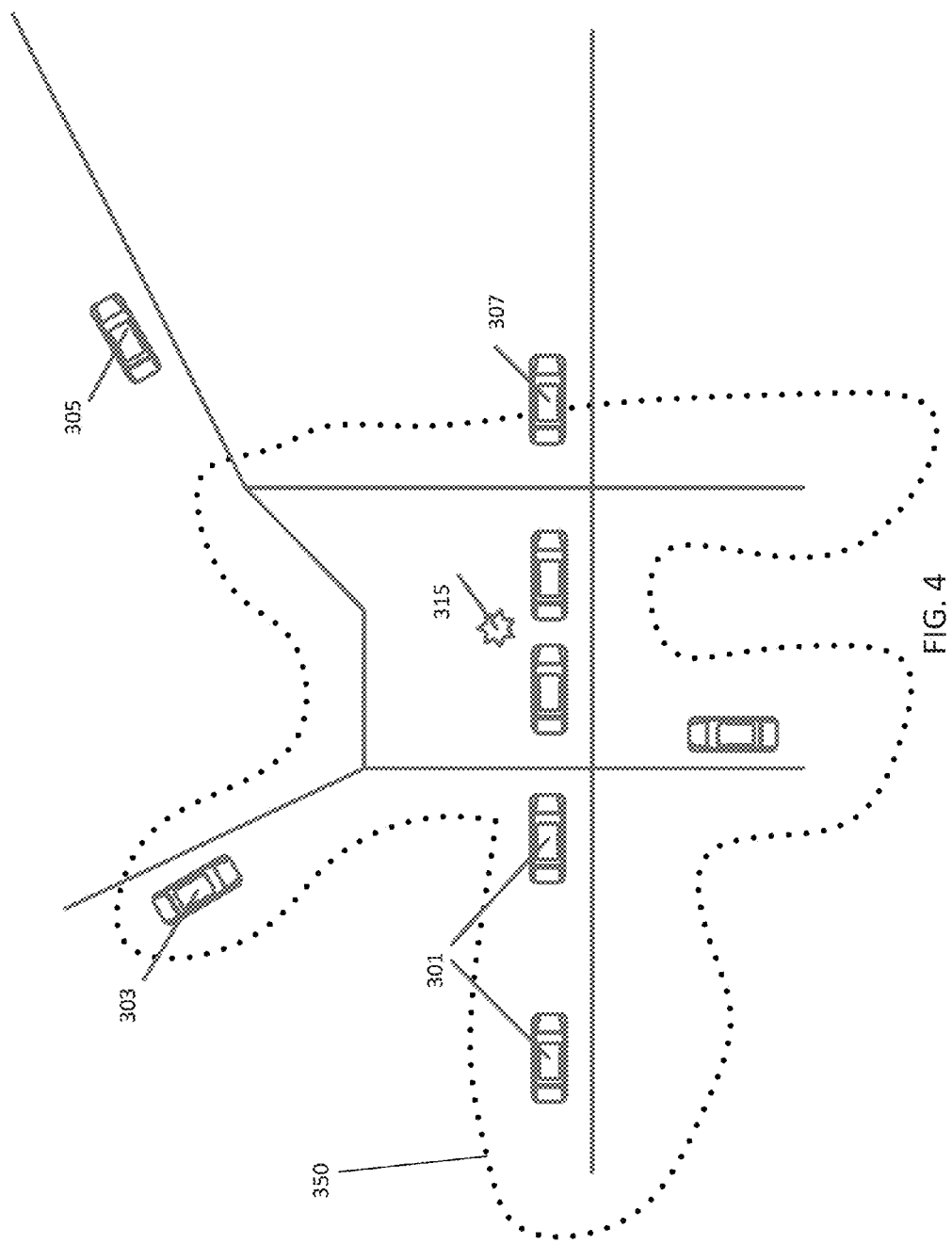
FIG. 4 illustrates an example roadway network, event, and geographic polygon.

FIG. 4 illustrates an impact area (as described by the boundary 350) for the incident described in FIG. 3. As shown, the boundary 350 is not just a bounded rectangle or circle but rather tracks the specific roads, roadway segments, and/or nodes which are affected. As such, the boundary may not be symmetrical or cover areas equidistant from the event 315. Even though vehicles 303 and 305 are approximately the same distance from the incident, only vehicle 303 is affected. Using the conditions presently known and the historical data, the location cloud 121 determines that the part of the road that vehicle 305 is on is not affected. In certain embodiments, the location cloud 121 may send out an alert directly to vehicles that are within the impact area. For example, one or more vehicles or devices may be directly connected the location cloud 121 potentially as collection devices or navigation devices. These device(s) may communicate directly with the location cloud 121 and as such may receive alerts directly if the location cloud 121 is aware of the devices' locations.

Figure 5:
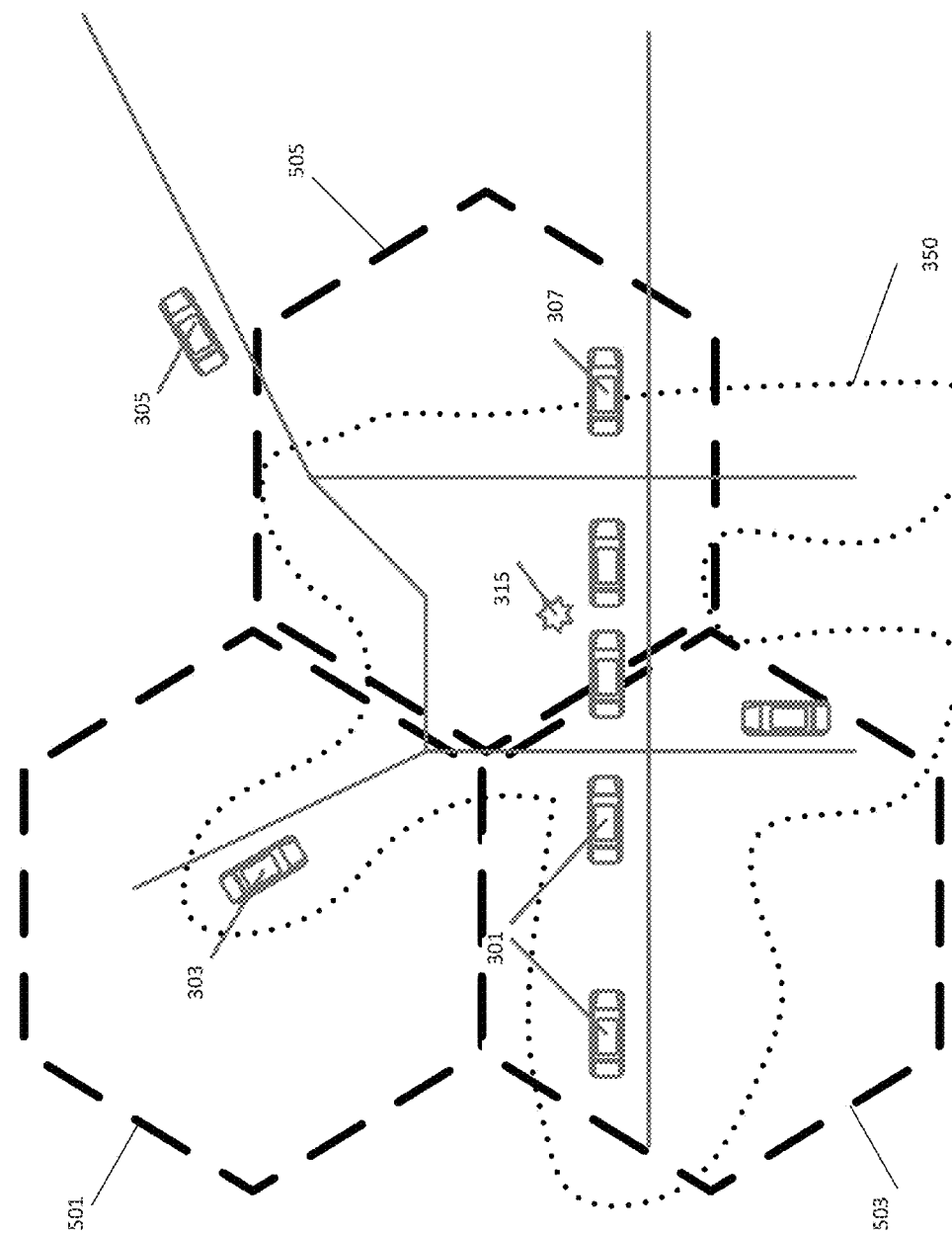
FIG. 5 illustrates an example roadway network, event, geographic polygon, and cellular network.

Once the impact area is determined, the polygon may be overlaid on a map of a cellular network. A cellular network may comprise one or more cells which represent coverage areas for cellular towers. FIG. 5 illustrates three cells of a cellular network that are effected by the impact area. Cell 501, 503, and 505 all contain at least a portion of the impact area and therefore would be targeted to receive the alert message. Additional cells not shown that also contain a portion of the impact are would also be targeted for the alert. The towers for the cells identified are then sent an alert message to transmit to the vehicles within the cells. As shown, vehicles 301, 303, and 307 would receive the alert, but vehicle 305 because it is not in a covered cell, would not receive the alert.

The alert message may contain a timeout setting. The timeout may be an amount of time, such as 10 min, or a set time such as 4:13 PM. Until the timeout is reached, the alert message may continue to be transmitted to devices or vehicles within the identified cells. When the timeout is reached, the towers may not continue to transmit the message and any device that had previously received the message may assume traffic is back to normal conditions. In certain embodiments, the alert message does not expire, but rather the location cloud 121 updates the message in order to either wind down an event and/or alter the impacted area. Additional information having been received while the alert was transmitted may also affect the severity of the incident.

Figure 6:
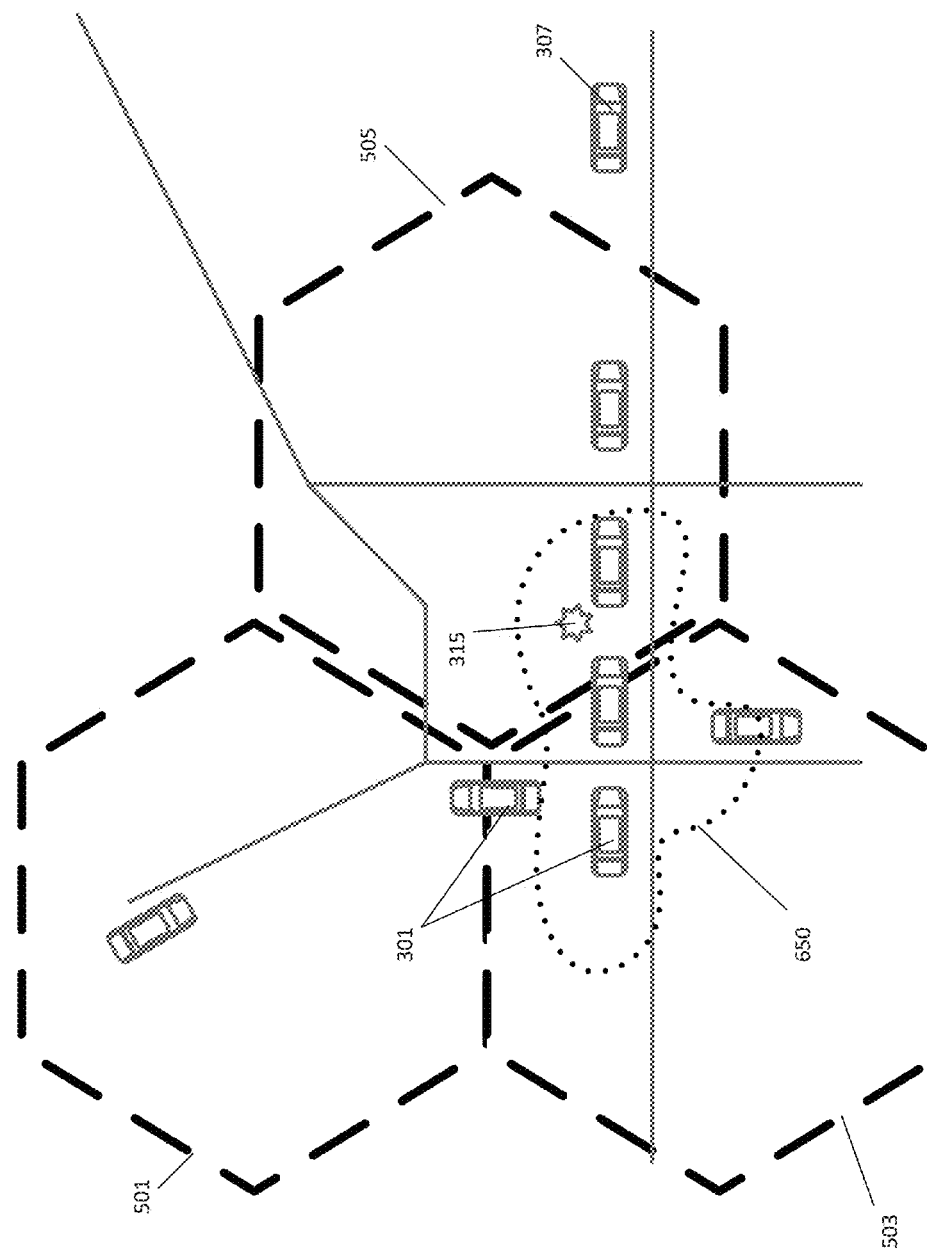
FIG. 6 illustrates an example roadway network, event, geographic polygon, and cellular network.

FIG. 6 shows the same incident as illustrated in FIGS. 3-5, but at a later point in time. As shown, the impacted area (as described by dotted boundary 650) is now considerably smaller. In this example, the location cloud 121 may have determined from subsequent events, or modeling based on historical data, that the incident has subsided. The acts for processing the event, and updating the impacted area 650 are repeated as stated above. The new impacted area 650 is overlaid on the cellular coverage/infrastructure map and the new alert (or updated alert) is transmitted though the cellular towers. In FIG. 6, the impact has changed and now when overlaid on the cellular maps does not include Cell 501. As such, the new alert will only be transmitted through the towers in Cell 503 and Cell 505. Vehicle 307 has moved outside the coverage area of Cell 505. Vehicle 307 will no longer receive the alert message. FIG. 6 illustrates an example of where the size of the impact area has reduced over time. The impact area may also increase in size over time as traffic backs up and affects more and more roads. A single event such as a traffic light out or a broken down vehicle may affect traffic multiple kilometers away over a long period of time. Even after being cleared or fixed, an event may still affect traffic on nearby roads even if the original location has returned to normal. As such, the polygon may not always include the event location but rather may morph to include other areas as the ripples of the event radiate outward.

Each of the vehicles that receive either the alert message or the updated alert message may use the information included to alter their routes, create new routes, or update arrival times. The information included may further affect the operation of the vehicles. For example, an alert that indicates low visibility ahead may automatically turn on the fog lights. For an autonomous vehicle, an alert may be used to update sensors or prepare the vehicle for upcoming hazards.

Figure 7:
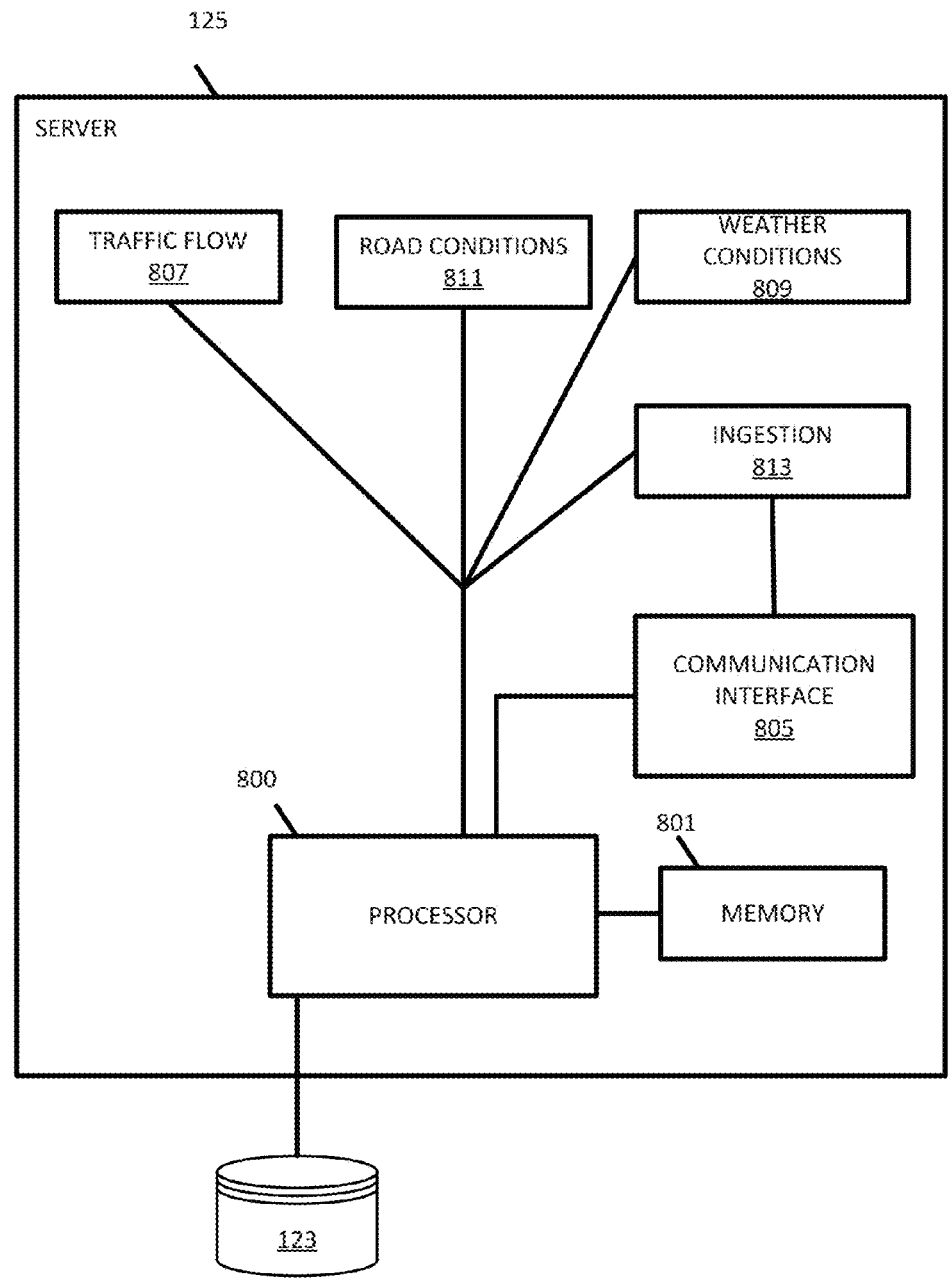
FIG. 7 illustrates an example server of the system for transmission of targeted roadway alerts of FIG. 1.

FIG. 7 illustrates an example location cloud 121 of FIG. 1. The location cloud 121 includes a server 125 and a database 121. The server 125 may include a sensor/incident ingestion module 813, real-time and historical traffic flow and incidents module 807, a weather module 809, a road conditions module 811, a processor 800, a communications interface 805, and a memory 801. The processor 800 is connected to the database. Each of the modules may be included within the processor 800. Each of the modules may also be connected to the database in order to access current, historical, and geographical data. The server 125 and associated modules are configured to receive an event message using the communications interface 805; the event message including a description of an incident. The server 125 and the modules are configured to generate an impact area of the incident using current and historical traffic flow information stored in memory 801 and the database 123. The server 125 is configured to generate a geographic polygon based on the impact are of the incident. The server 125 is configured to transmit an alert message and the geographic polygon to a cellular provider. The server 125 is also configured to transmit the alert message to one or more device(s) 122 located within the geographically using the communication interface 805.

The processor 800 may include one or more of the sensor/incident ingestion module, the real-time and historical traffic flow and incidents module, weather module, and/or road conditions module. The processor 800 is configured to receive collected data from the device(s), determine an event, and generate an impact area and incident event. The processor 800 may be configured to request and receive data through the communication interface. The processor 800 may also be configured to access the database including current and historical data. The processor 800 may be configured to use the geographic maps to generate a precise impact area.

The real-time and historical traffic flow and incidents module 807 (or traffic module) models current and future traffic flow in an area based on historical data, incident events, and other road event data. The traffic module 807 may store current and future traffic flow predictions for later use to decrease latency if future similar incidents occur. The traffic module 807 may generate alerts regarding incidents or events.

The weather module 809 receives and processes weather data. The weather module 809 may collect weather data from sensors such as in-vehicle sensors, other on-ground sensor, weather services, or third party sources. The weather module 809 may generate alerts regarding weather conditions at specific locations such as fog (low visibility), rain, snow, wind, among others.

The road conditions module 811 receives and processes road condition data. The road conditions module 811 may collect road condition data from sensors such as in-vehicle sensors, field personal, third party sources, or other collection apparatus or services. The road conditions module 811 may generate alters regarding road conditions such as icy roads, flooding, certain construction issues, among others.

The sensor/incident ingestion module 813 may be configured to collect or ingest data from one or more collection devices or other sources using the communications interface 805. The sensor/incident ingestion module may be configured to determine if an event is part of an ongoing incident or if the event is a new incident.

Figure 8:
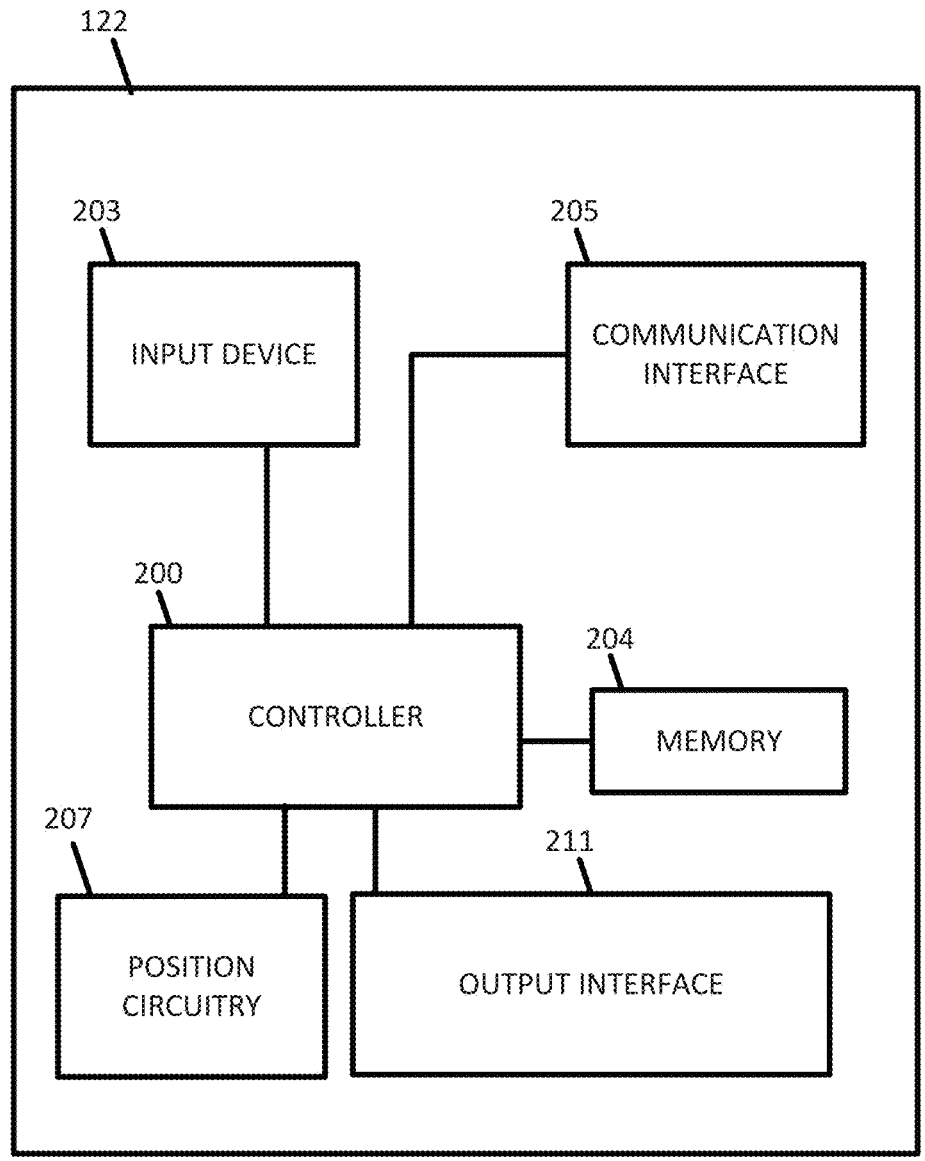
FIG. 8 illustrates an example device of the system for transmission of targeted roadway alerts of FIG. 1.

FIG. 8 illustrates an example collection device of FIG. 1. The collection device 122 includes an input device 203, a communication interface 205, a controller 200, a memory 204, position circuitry 207, and an output interface 211. Additional, different, or fewer components are possible for the device 122. The collection device (or device) 122 may be a mobile device or a tracking device that provides samples of data for the location of a vehicle. The collection device 122 may be mobile phones running specialized applications that collect location data as people travel roads as part of their daily lives. The device 122 may also be integrated in or with a vehicle. Switches, sub-systems or sensors that are either standard or optional equipment on a vehicle may collect and aggregate information regarding the operation of the vehicle. The device(s) may also be a sensor or a collection of sensors, such as an inductance loop or optical detector (e.g., camera, light detection and ranging (LiDAR), or radar device). The device(s) may be a camera/imaging sensor for gathering image data (e.g., the camera sensors may automatically capture traffic flow information and/or traffic light information. The device(s) may be sensors located on the perimeter of the vehicle in order to detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In addition to collection data, the device 122 may be configured to execute routing algorithms to determine a route to travel along a road network from an origin location to a destination location in a geographic region. The device 122 may use the positioning circuitry 207 to determine a location of the device 122 and the input device 203 to specify a destination location.

Figure 9:
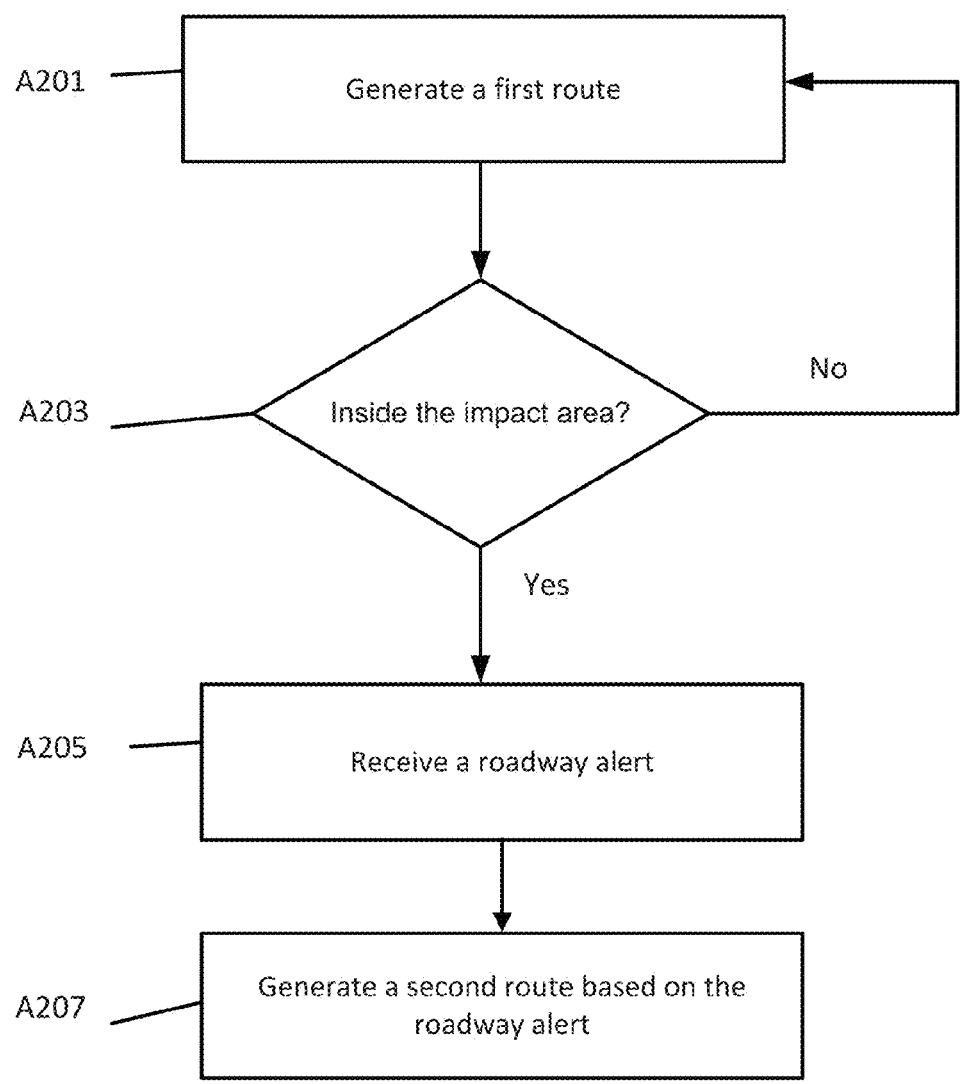
FIG. 9 illustrates an example flow chart of an method for transmission of targeted roadway alerts

FIG. 9 illustrates a flow chart of an example embodiment for transmission of targeted roadway alerts. As presented in the following sections, the acts may be performed using any combination of the components indicated in FIG. 1, FIG. 7, or FIG. 8. The following acts may be performed by the device 122, server 125, the location cloud 121, or a combination thereof. Additional, different, or fewer acts may be provided. The acts are performed in the order shown or other orders. The acts may also be repeated.

At act A201, the device 122 generates a first route. The device may be a navigation system or configured as a navigation service in a vehicle. The device uses positioning circuitry 207 to determine a current location. The controller 200 uses mapping software or navigation software to determine a first route to a destination. The device 122 may maintain a local map database stored in memory 204 which may be updated from a server. The device 122 may also request a route from a current location to a destination from a navigation service or server. A user may use the input device 203 to enter a destination. The user may also enter a starting location other than the current location. The route may be displayed on the output interface 211.

The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored map database.

The positioning circuitry 207, which is an example of a positioning system, is configured to determine a geographic position of the device 122. The movement circuitry 208, which is an example a movement tracking system, is configured to determine movement of a device 122. The position circuitry 207 and the movement circuitry 208 may be separate systems, or segments of the same positioning or movement circuitry system. In an embodiment, components as described herein with respect to the device 122 may be implemented as a static device.

The input device 203 may be one or more buttons, keypad, keyboard, mouse, stylist pen, trackball, rocker switch, touch pad, voice recognition circuit, or other device or component for inputting data to the device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

At act A203, a determination is made of whether the device 122 is in an impacted area of an incident; the impact area derived from an event and current and historical traffic data. The device 122 may be in contact with a server 125 or location cloud 121. The server 125 or location cloud 121 may receive updates on the location of the device 122 as determined by the positioning circuitry 207.

At act A205, if the device 122 is in the impacted area at the time an alert message is transmitted to that area, the device 122 may receive the alert using the communication interface 205. If the device 122 is not in the impacted area, the device continues to use the first route (or recalculate the first route based on other information).

The communication interface 205 and/or communication interface 805 may include any operable connection. An operable connection may be one in which signals, physical communications, and/or logical communications may be sent and/or received. An operable connection may include a physical interface, an electrical interface, and/or a data interface. The communication interface 205 and/or communication interface 805 provides for wireless and/or wired communications in any now known or later developed format. The communication interface 205 and/or communication interface 805 may include a receiver/transmitter for digital radio signals or other broadcast mediums. A receiver/transmitter may be externally located from the device 122 such as in or on a vehicle.

At act A207, the device 122 generates a second route based on information in the roadway alert received at act A205. The roadway alert may contain information such as a new traffic pattern or a traffic event which may alter travel times or route options (such as road closures). The controller 200 uses the information in the alert to generate an updated or second route from the current position to the destination.

The controller 200 and/or processor 800 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving a first description of an incident;
    determining an impact area of the incident based on the first description, the impact area comprising one or more road segments;
    generating a geographic polygon based on the impact area of the incident, the geographic polygon describing an area different than the impact area;
    overlaying the geographic polygon on a first cellular map;
    transmitting an alert message to one or more devices located within a cell of the first cellular map that contains at least a portion of the geographic polygon;
    overlaying the geographic polygon on a second cellular map, wherein the second cellular map includes different coverage patterns than the first cellular map; and
    transmitting the alert message to a device within a cell of the second cellular map that contain at least a portion of the geographic polygon.

2. The method of claim 1, further comprising:
    generating an updated impact area of the incident at a subsequent time;
    generating an updated geographic polygon based on the updated impact area;
    overlaying the updated geographic polygon on the first cellular map; and
    transmitting an updated alert message to one or more devices located within a cell of the first cellular map that contains at least a portion of the updated dynamic geographic polygon.

3. The method of claim 1, wherein the first description of the incident is received from a sensor integrated within a vehicle.

4. The method of claim 1, wherein determining an impact area comprises:
    using the first description, current traffic data, and historical flow data to predict a traffic pattern as a result of the incident; and
    determining a geographic area where current traffic is affected by the predicted traffic pattern.

5. The method of claim 4, wherein the geographic area is comprised of one or more road segments.

6. The method of claim 4, further comprising using weather data to predict the traffic pattern.

7. The method of claim 1, wherein the alert message has a timeout, wherein after the timeout expires, the alert message is not transmitted.

8. The method of claim 1, wherein the dynamic geographic polygon is archived to use for future incidents.

9. The method of claim 1, wherein the alert message includes information that alters a route of the device.

10. The method of claim 1, further comprising:
receiving a second description of the incident, wherein determining an impact area of the incident is based on the first description and second description.

11. An apparatus comprising:
at least one processor; and
at least one memory including computer program code for one or more programs; the at least one memory configured to store the computer program code configured to, with the at least one processor, cause the apparatus to at least perform:
receiving a description of an incident;
generating an impact area of the incident based on the description;
generating a geographic polygon based on the impact area of the incident, the geographic polygon different than the impact area;
transmitting an alert message and the geographic polygon to a first cellular provider; and
transmitting an alert message and the geographic polygon to a second cellular provider;
wherein the first cellular provider and second cellular provider maintain different cellular patterns of coverage for the geographic polygon.

12. The apparatus of claim 11, wherein the at least one memory and computer program code are configured to cause the apparatus to further perform:
generating an updated impact area of the incident at a second time;
generating an updated geographic polygon based on the updated impact area; and
transmitting the alert message and the updated geographic polygon to the first cellular provider.

13. The apparatus of claim 11, wherein the alert message has a timeout, wherein after the timeout expires, the alert message is not transmitted.

14. The apparatus of claim 11, wherein generating an impact area comprises:
using current traffic and historical flow information to predict a traffic pattern as a result of the incident; and
determining the geographic area where current traffic is affected by the traffic pattern.

* * * * *